United States Patent [19]

Poole

[11] 3,951,050

[45] Apr. 20, 1976

[54] TUBE FORMING PROCESS

[75] Inventor: Robert Norman Poole, Kingston, Canada

[73] Assignee: Du Pont of Canada, Ltd., Montreal, Canada

[22] Filed: Oct. 16, 1974

[21] Appl. No.: 515,313

[30] Foreign Application Priority Data

Dec. 13, 1973 Canada .................................. 188086

[52] U.S. Cl. .................................. 93/35 R; 93/19; 93/1 F; 93/94 R; 156/203; 156/466; 156/497
[51] Int. Cl.² ...................... B31B 1/72; B31B 23/60
[58] Field of Search .............. 93/DIG. 1, 35 R, 1 F, 93/14, 17–20, 94 R, 33 H, 33 R; 156/201, 202, 203, 465, 466, 497, 304

[56] References Cited
UNITED STATES PATENTS

| | | | |
|---|---|---|---|
| 2,372,737 | 4/1945 | Phillips, Jr. | 156/497 |
| 2,490,930 | 12/1949 | Thompson | 93/DIG. 1 |
| 2,614,953 | 10/1952 | Anglada | 93/DIG. 1 |
| 3,029,175 | 4/1962 | Stenqvist | 93/DIG. 1 |
| 3,837,972 | 9/1974 | Schuster | 156/497 X |
| 3,850,716 | 11/1974 | Podvin | 156/497 X |

Primary Examiner—James F. Coan

[57] ABSTRACT

The invention provides a continuous process for producing tubes from sheeting coated on at least one face with a heat sealable composition that melts at a lower temperature than the sheeting itself. The process essentially comprises the steps of supplying the coated sheeting to a folding means, folding the sheeting longitudinally so that its edges are in juxtaposition in the same plane, supplying a sealing ribbon coated with a heat sealable composition of lower melting temperature than the ribbon itself, the composition being heat sealable to the composition coating the sheeting, and directing the sealing ribbon to be centrally over the juxtaposed edges of the folded sheeting, the coated surface of the sealing ribbon being adjacent to that of the folded sheeting, directing hot air towards the line of contact of the coated surfaces of the sheeting and the sealing ribbon in volume and temperature sufficient to soften the coatings of both the ribbon and the folded sheeting in the vicinity of the edges of the folded sheeting, immediately pressing the ribbon to the folded sheeting with sufficient pressure to form a seal, and cutting the tube so formed into predetermined lengths. Apparatus to implement the process is also disclosed.

1 Claim, 4 Drawing Figures

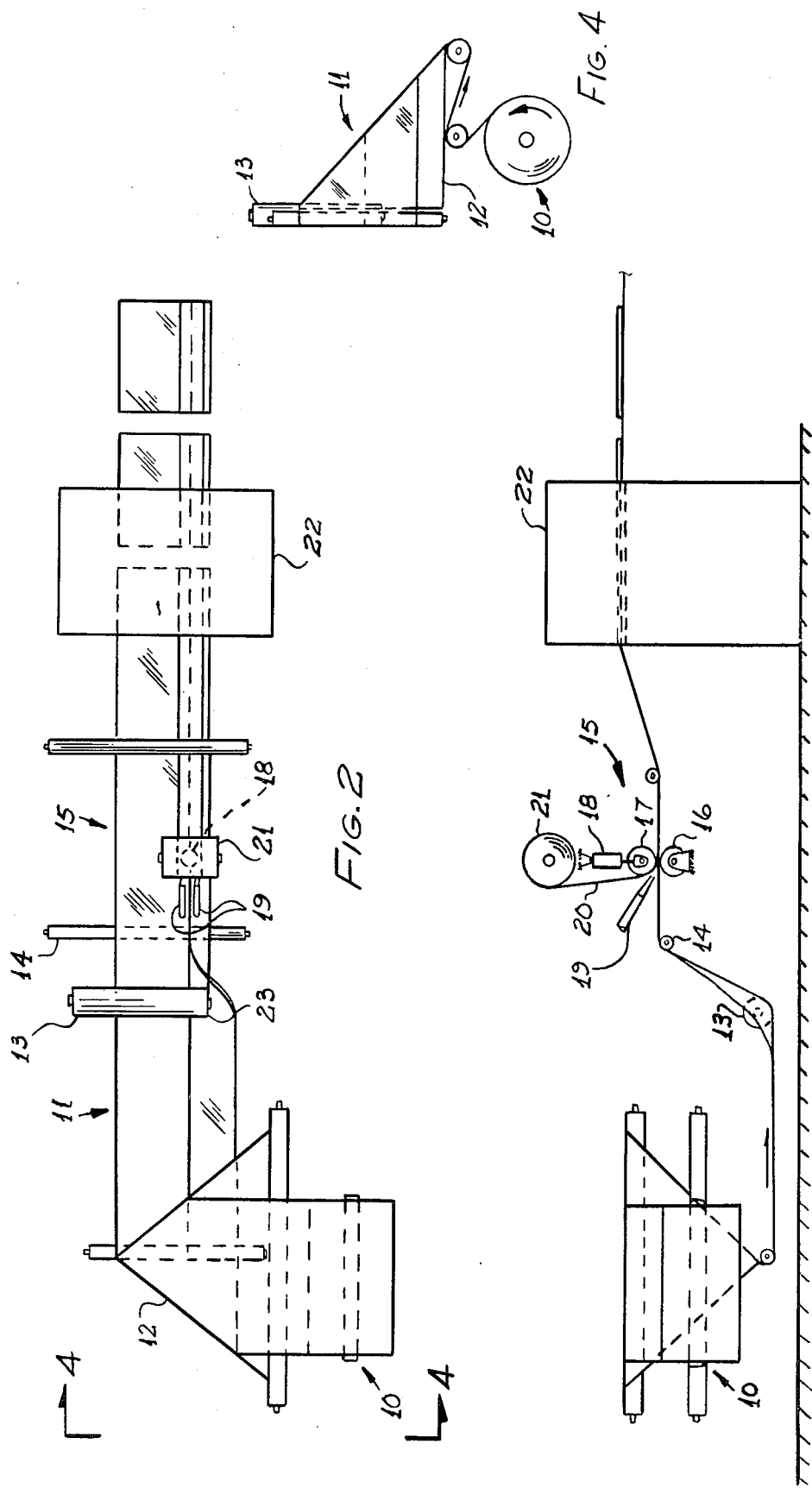

TUBE FORMING PROCESS

This invention relates to the production of bags from sheet material and is directed to the folding and sealing of sheeting so as to form a tube which may be cut into desired lengths for bags. In particular this invention concerns process and apparatus in which heavy duty industrial bags may be fabricated at high speeds from sheeting, especially sheeting woven from tapes of oriented slit polyolefin film which is coated on at least one side with a polyolefin that melts at a lower temperature than the polyolefin of the sheeting.

Traditionally heavy duty textile industrial bags have been manufactured from materials such as jute, burlap, and cotton on machinery designed to sew seams. However appropriate for these materials, sewn seams have been shown to reduce the strength of sheeting woven from tapes of oriented slit polyolefin films having a low density polyethylene coating by as much as 60% at the seam. In addition two important characteristics of this sheeting, viz. moisture and dust resistance, may become deficient for some end uses.

The art discloses many ways of forming a seal in plastic films, for example band sealers, impulse sealers and hot bar sealers. These sealing devices usually require heat to pass through the fabric to the interface to be sealed. Since damage has been observed when fabric temperatures exceed 220°F this type of heat sealing may not be acceptable to produce a seal at high speeds.

Other sealing methods such as hot melt or molten resin sealing tend to be less desirable because they are too complicated.

It is an object of this invention to provide a simple process by which tubing may be formed for bag making, that may be operated at high speeds and yet produce strong seams in the tubing.

It is another object of this invention to provide apparatus which will carry out such process.

Other objects will become apparent on reading the following disclosure.

Accordingly, the present invention provides a continuous process for producing tubes from sheeting coated on at least one face with a heat sealable composition that melts at a lower temperature than the sheeting itself, said process essentially comprising the steps of:
1. supplying the coated sheeting to a folding means,
2. folding the sheeting longitudinally so that its edges are in juxtaposition in the same plane, that composition coating the sheeting on at least the exterior surface of the folded sheeting,
3. supplying a sealing ribbon coated with a heat sealable composition that melts at a lower temperature than the sealing ribbon, said composition being heat sealable to the composition coating the sheeting, and directing said sealing ribbon to lie over the juxtaposed edges of the folded sheeting, the coated surface of the sealing ribbon being adjacent to that of the folded sheeting,
4. directing hot air towards the line of contact of the coated surfaces of the sheeting and the sealing ribbon in volume and temperature sufficient to soften the coating of both the ribbon and the folded sheeting in the vicinity of the edges of the folded sheeting,
5. immediately pressing the ribbon to the folded sheeting with sufficient pressure to form a seal, and
6. cutting the tube so formed into predetermined lengths.

In a preferred embodiment the sheeting is woven high density polyethylene which is coated with low density polyethylene; the sealing ribbon is of the same fabric and coated with the same composition.

In other embodiments the sheeting is woven polypropylene that is coated with polypropylene, woven polyester coated with PVC, woven polyester coated with polyurethane or uncoated sheeting but woven from bicomponent tapes made with a low density polyethylene and high density polyethylene; the sealing ribbons being of the same construction as the sheeting.

The present invention also provides apparatus for producing tubes capable of being made into bags essentially comprising in combination:
a. an unwind device fitted with a braking system and an automatic edge guide being adapted to direct a supply of sheeting to a folding means,
b. a folding means being adapted to form the sheeting into a tube and to direct it to a sealing means,
c. a sealing means including:
 1. a sealing ribbon being adapted to cover the longitudinally aligned edges of the folded sheeting issuing from the folding means,
 2. at least one hot air sealing gun being adapted to direct hot air towards the line of contact of the meeting surfaces of the sealing ribbon and the folded sheeting, and
 3. nipping rollers being adapted to press the sealing ribbon to the edges of the folded sheeting at the said line of contact,
d. a cutting means being adapted to cut the sealed tube produced into predetermined lengths, and
e. a transporting means being adapted to continuously transport the sheeting through the apparatus.

In the drawings attached hereto which illustrate one embodiment of this invention:

FIG. 2 is a detailed plan view of the embodiment including three sectional views of the sheeting at the folding and sealing stations.

FIG. 3 is an elevation view of the embodiment shown in FIG. 2.

FIG. 4 is an end view of the embodiment shown in FIG. 2.

Figure 1:
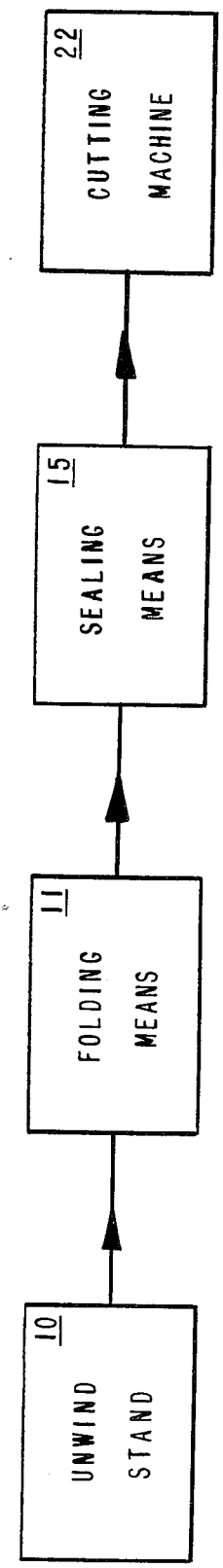
FIG. 1 is a schematic diagram of the major elements of the embodiment.

The apparatus illustrated comprises an unwind stand 10, a folding means 11, a sealing means 15 and a cutting machine 22.

The unwind stand 10 is fitted with a braking system (not shown) to provide web tension and with an automatic edge guide (not shown) to provide constant web position irrespective of roll formation.

The folding means 11 is made up of a conventional V-folder 12, an edge roller 13 and an idler roller 14.

The sealing means 15 includes a stationary idling lower nip roller 16, a moveable idling upper nip roller 17 which is controlled by a pneumatic cylinder 18, two hot air sealing guns 19 and a sealing ribbon 20 which is mounted on a roll 21.

The sealing ribbon 20 is separately supplied from roll 21 into the nip rolls 16 and 17 so as to meet with the edges of the folded sheeting at a nip point where said ribbon 20 is immediately nipped to the sheeting edges by the nip rolls 16 and 17.

The two hot air guns 19 are positioned as close as possible to the interface of the coated surfaces of the sealing ribbon 20 and the edges of the folded sheeting at the nip point so that hot air is delivered directly to said nip point.

The guns 19 are spaced to conform with the width of the sealing ribbon 20 and the line formed by the edges of the sheeting.

The conventional cutting machine 22 is adapted to accept a continuously moving web travelling at a constant speed and to cut it clearly into desired lengths. Motive force to pull the sheeting from the supply through the apparatus is supplied by the cutting machine 22.

In a preferred embodiment of the folding means 11 the folded sheeting coming from the V-folder 12 will change direction as it passes under the edge folding roller 13. At this point the free projecting edge of the lower half of the sheeting delivered from the V-folder 12 is folded part way back upon itself until the edge of the lower part is aligned with the edge of the upper part of the folded sheeting.

The extent of the fold back just described is controlled by the position of the end 23 of the edge folding roller 13 relative to the end of the sheeting.

As mentioned above there is a change in direction of travel of the sheeting as it passes under the edge folding roller 13 and continues to the idler roller 14. A change in direction of 30° to 60° is adequate to achieve fold back. In the preferred embodiment the change in sheet direction is 45°.

The edge folding roller 13 in the preferred embodiment has a diameter of 5 inches, however diameters of 4 inches to 6 inches will produce a fold back of up to 2½ inches when rollers 13 and 14 are 15 inches apart.

In the preferred embodiment of the sealing means 15 the two nip rolls 16 and 17 are 4 inches in diameter with a face width of 5 inches. The face width is determined by the width of the seal to be formed in other embodiments. Air pressure to the pneumatic cylinder 18 may be regulated to achieve a minimum pressure at the nip of 20 psi. Preferably a rubber covering of at least ¼ inch of silicon rubber with a durometer hardness of 60 (Shore "A") is present on the surface of the lower roller 16. A medium "knurling" or roughening of the face of the upper roll 17 is desirable.

The two hot air guns 19 are mounted in parallel and located so that their nozzles are about 1¼ inches away from the nip point on an angle of about 15° from the sheeting surface at said nip point.

The nozzles are slotted to provide a rectangular opening of 1⅛ inches length and 1/16 inch width with the length running parallel to the innterface of the nip rollers. In other embodiments the nozzles may be located and designed differently to accommodate other conditions.

In the preferred embodiment each hot air gun is a self contained unit with its own individual heating-element, air and electrical supply.

The supply of compressed air required for each gun is passed through individual regulating valves and delivered to each nozzle or gun. In a similar manner a supply of 220 V. to 60 cycle, 1 phase power is supplied to two variable transformers (output voltage 0–240 V), one for each gun. Thus both voltage to the heating element and supply of air may be regulated on each gun individually.

Air pressure delivered to the guns is 35 psig.

Voltage to each gun is dependent upon sealing speed desired but at 140 fpm a voltage of 180 V to each gun is sufficient.

The cutting machine is conventional and may be equipped with a 2 H.P. motor to move the material through the apparatus.

It will be appreciated that other embodiments may use means other than electricity to heat the air or that hot noncombustible gases other than air may accomplish the same purpose. Also the dimensions and specifications of the preferred embodiment may be changed in other embodiments.

The embodiments of the invention in which an exclusive property or privilege is claimed are defined as follows:

1. A continuous process for producing tubes for heavy duty industrial bags, said process essentially comprising the steps of:
   1. supplying a sheeting to a folding means, said sheeting being of fabric woven from tapes of oriented polyolefin film which is coated on one side with a lower density polyolefin that melts at a lower temperature than the fabric and said sheeting being transported continuously through an apparatus for producing said tubes,
   2. folding the sheeting longitudinally so that its edges are in juxtaposition in the same plane and the coating on the sheeting is on at least the exterior of the folded sheeting,
   3. supplying a sealing ribbon of the same fabric as said sheeting coated with the same composition, said composition being heat sealable to the composition coating the sheeting, and directing said sealing ribbon to lie over the juxtaposed edge of the folded sheeting, the coated surface of the sealing ribbon being adjacent to the coated surface of the folded sheeting, said ribbon being transported continuously through said apparatus for producing said tubes,
   4. directing hot air towards the line of contact of the coated surfaces of the sheeting and the sealing ribbon in volumne and temperature sufficient to soften the coatings of both the ribbon and the folded sheeting in the vicinity of the edges of the folded sheeting,
   5. immediately pressing the ribbon to the folded sheeting with sufficient pressure to form a seal, and
   6. cutting the tube so formed into predetermined lengths.

* * * * *